(12) United States Patent
Han et al.

(10) Patent No.: US 9,372,504 B2
(45) Date of Patent: Jun. 21, 2016

(54) MULTI DISPLAY APPARATUS AND HINGE DEVICE THEREFOR

(75) Inventors: Sang Hoon Han, Suwon-si (KR); Young Tai Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1426 days.

(21) Appl. No.: 12/902,322

(22) Filed: Oct. 12, 2010

(65) Prior Publication Data

US 2011/0084892 A1 Apr. 14, 2011

(30) Foreign Application Priority Data

Oct. 13, 2009 (KR) ........................ 10-2009-0097214
Aug. 31, 2010 (KR) ........................ 10-2010-0085024

(51) Int. Cl.
*E05D 11/00* (2006.01)
*G06F 1/16* (2006.01)
*E05D 1/04* (2006.01)
*E05D 11/04* (2006.01)

(52) U.S. Cl.
CPC ................ *G06F 1/1601* (2013.01); *E05D 1/04* (2013.01); *E05D 11/04* (2013.01); *E05Y 2900/606* (2013.01); *Y10T 16/5377* (2015.01); *Y10T 16/554* (2015.01); *Y10T 16/558* (2015.01)

(58) Field of Classification Search
CPC ....... E05D 1/04; E05D 2001/04; E05D 11/04; E05D 11/06; E05D 11/08; E05D 1/06; E05D 2001/045; E05D 3/18; E05D 1/045
USPC ............. 361/679.04–679.07, 679.22, 679.27; 16/253, 271, 276, 313, 235, 249, 250, 16/251, 252, 267, 268, 269, 275, 284, 224
See application file for complete search history.

(56) References Cited

U.S. PATENT DOCUMENTS

| 4,322,870 | A * | 4/1982 | Lautenschlager | 16/235 |
|---|---|---|---|---|
| 5,128,662 | A * | 7/1992 | Failla | 345/1.3 |
| 5,490,306 | A * | 2/1996 | Floyd et al. | 16/250 |
| 5,940,934 | A * | 8/1999 | Turner | 16/257 |
| 6,292,981 | B1 * | 9/2001 | Ford et al. | 16/357 |
| 6,317,929 | B1 * | 11/2001 | Ring | 16/355 |
| 7,306,075 | B2 * | 12/2007 | Winslow et al. | 182/163 |
| 8,082,631 | B2 * | 12/2011 | Eromaki | 16/370 |
| 2005/0081333 | A1 * | 4/2005 | Emerson et al. | 16/250 |

(Continued)

FOREIGN PATENT DOCUMENTS

DE 4320322 A1 * 12/1993
EP 1538290 A2 * 6/2005

(Continued)

*Primary Examiner* — Hoa C Nguyen
*Assistant Examiner* — Christopher L Augustin
(74) *Attorney, Agent, or Firm* — Sughrue Mion, PLLC

(57) ABSTRACT

A multi display apparatus is provided. The multi display apparatus includes a first display device and a second display device arranged adjacent to each other, and a hinge device provided to rotate the first display device and the second display device relative to each other, wherein the hinge device includes a first hinge member fixed to the first display device, and a second hinge member fixed to the second display device and connected to the first hinge member such that the second hinge member is movable in a circumferential direction with respect to an interface between adjacent side surfaces of the first display device and the second display device.

10 Claims, 8 Drawing Sheets

(56) References Cited

U.S. PATENT DOCUMENTS

2009/0145337 A1* 6/2009 Shen et al. .................. 108/39
2010/0170064 A1* 7/2010 Huang .................. G06F 1/1616
16/387

FOREIGN PATENT DOCUMENTS

| JP | 2007-219194 A | 8/2007 |
| KR | 10-2000-0039480 A | 7/2000 |
| WO | 03/073402 A1 | 9/2003 |

* cited by examiner

MULTI DISPLAY APPARATUS AND HINGE DEVICE THEREFOR

CROSS-REFERENCE TO RELATED APPLICATION

This application claims priority from Korean Patent Application No. 10-2009-0097214, filed Oct. 13, 2009 and Korean Patent Application No. 10-2010-0085024, filed Aug. 31, 2010, in the Korean Intellectual Property Office, the disclosure of which is incorporated herein by reference in its entirety.

BACKGROUND

1. Field

Apparatuses and methods consistent with exemplary embodiments relate to a multi display apparatus having a plurality of display devices and a hinge device therefor.

2. Description of the Related Art

Display devices display an image using an image signal transmitted thereto. Recently, a multi display apparatus, in which plural display devices are arranged horizontally and vertically such that a picture or an image is divisionally displayed on the screens of the plurality of display devices and thus the plurality of display devices serve as one display device having one large screen, has been developed. However, connecting the display devices to one another without one display device physically interfering with the adjacent display device may be difficult.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

Exemplary embodiments provide a multi display apparatus in which two neighboring display devices are installed to be rotated relative to each other, and a hinge device therefor.

According to an aspect of an exemplary embodiment, a multi display apparatus includes a first display device and a second display device arranged adjacent to each other, and a hinge device provided to rotate the first display device and the second display device relative to each other, wherein the hinge device includes a first hinge member fixed to the first display device, and at least one second hinge member fixed to the second display device and connected to the first hinge member such that the at least one second hinge member is movable in the circumferential direction.

The first hinge member may include a first fixing part fixed to the rear surface of the first display device, and first hinge parts extended backwardly from the first fixing part, and the at least one second hinge member may include a second fixing part fixed to the rear surface of the second display device, and second hinge parts extended backwardly from the second fixing part and connected to the first hinge parts such that the second hinge parts are movable in the circumferential direction.

The hinge device may further include guide pins passing through the first hinge parts and the second hinge parts, guide slots, in which the guide pins are installed such that the guide pins are movable in the circumferential direction, extended in the circumferential direction may be provided on the first hinge parts, and through holes, through which the guide pins pass, may be provided on the second hinge parts.

A pair of the through holes may be provided on each of the second hinge parts such that the through holes are separated from each other in the circumferential direction, and a pair of the guide pins may be provided so as to pass through the pair of the through holes and the guide slots, respectively.

At least one of the first hinge parts and the second hinge parts may be provided in the plural number such that the at least one of the first hinge parts and the second hinge parts are separated from each other in the axial direction of the pins, and thus the first hinge parts and the second hinge parts may be alternately arranged.

Each of the guide pins may include a head part supported by any one of regions of the first hinge parts adjacent to the guide slots and regions of the second hinge parts adjacent to the through holes, and a body part passing through the guide slots and the through holes, and the hinge device may further include separation prevention rings, each of which is installed at the front end of the body part passed through the through holes and the guide slots to maintain a state of the body part installed in the through holes and the guide slots.

A central point of arcs of the guide slots may be located at the front end of the interface between the opposite side surfaces of the first display device and the second display device.

The at least one second hinge member may include an upper second hinge member arranged above the upper surface of the first hinge member, and a lower second hinge member arranged below the lower surface of the first hinge member.

The upper second hinge member may include a cover part extended so as to cover rear portions of the first hinge member and the lower second hinge member.

The hinge device may further include a guide pin vertically passing through the first hinge member, a through hole formed through the first hinge member so as to install the guide pin, and guide slots respectively provided in the circumferential direction on the lower surface of the upper second hinge member and the upper surface of the lower second hinge member such that both ends of the guide pin move in the circumferential direction along the guide slots, respectively.

The hinge device may further include a first fixing piece fixed to the first hinge member and fixed to the rear surface of the first display device, and a second fixing piece fixed to the upper second hinge member and the lower second hinge member and fixed to the rear surface of the second display device.

The multi display apparatus may further include rolling members arranged between the first fixing member and the upper and lower second hinge members.

The rolling members may include a plurality of rolling members separated from each other in lines in the circumferential direction.

The rolling members may be arranged between the upper surface of the first hinge member and the upper second hinge member and between the lower surface of the first hinge member and the lower second hinge member.

The multi display apparatus may further include a plurality of receipt holes provided on the upper surface and the lower surface of the first hinge member and separated from each other in the circumferential direction so as to receive one portion of each of the rolling members, and guide grooves respectively provided in the circumferential direction on the lower surface of the upper second hinge member and the upper surface of the lower second hinge member so as to movably install the other portion of each of the rolling members.

According to an aspect of another exemplary embodiment, a multi display apparatus includes a first display device and a second display device arranged adjacent to each other, and a hinge device provided to rotate the first display device and the second display device relative to each other, wherein the hinge device includes a first hinge member fixed to the first display device, and at least one second hinge member fixed to the second display device and connected to the first hinge member such that the at least one second hinge member is movable in the circumferential direction, and a central point of the arc of the at least one second hinge member moving in the circumferential direction is located at the front end of the interface between the opposite side surfaces of the first display device and the second display device.

According to an aspect of another exemplary embodiment, a hinge device includes a first hinge member fixed to a first member, and at least one second hinge member fixed to a second member and connected to the first hinge member such that the at least one second hinge member is movable in the circumferential direction.

BRIEF DESCRIPTION OF THE DRAWINGS

The above and/or other aspects will become apparent by describing certain exemplary embodiments, with reference to the accompanying drawings in which.

DETAILED DESCRIPTION OF EXEMPLARY EMBODIMENTS

Figure 1:
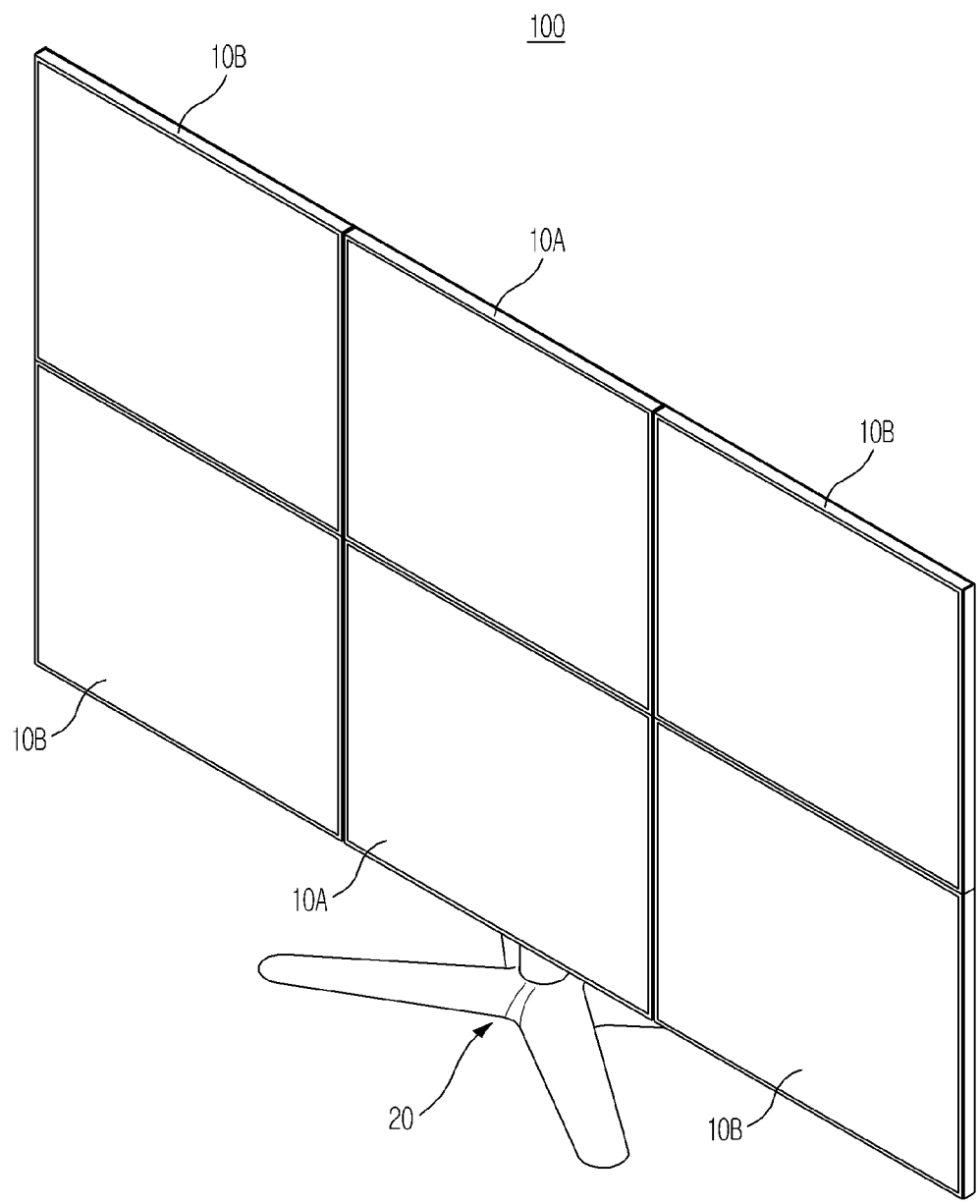
FIGS. 1 and 2 are perspective views illustrating the operation of a multi display apparatus according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters.

Figure 2:
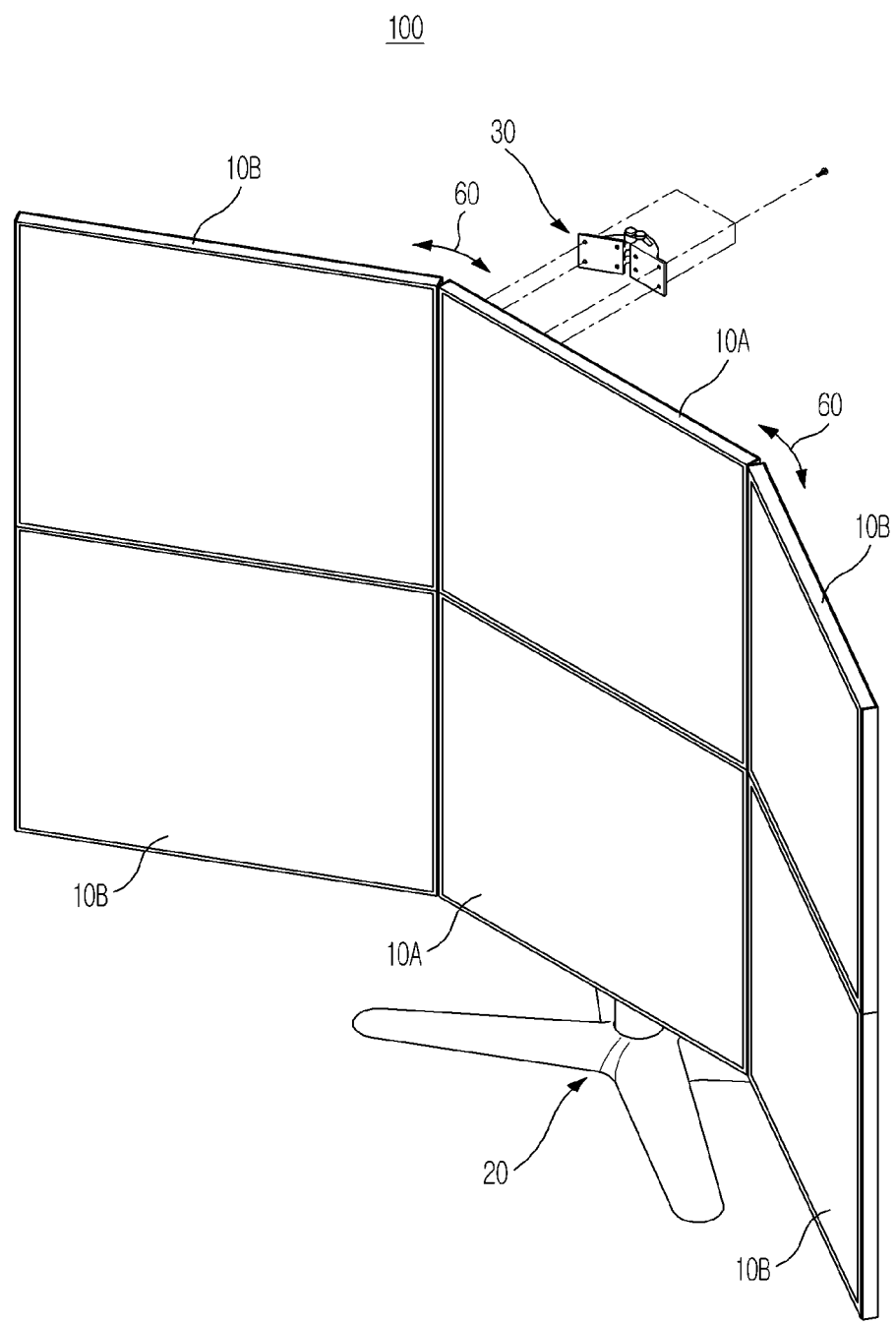

As shown in FIGS. 1 and 2, a multi display apparatus 100 in accordance with an exemplary embodiment includes plural display devices 10A and 10B, which are arranged horizontally and vertically. In this exemplary embodiment, three sets of display devices 10A and 10B are arranged in two rows in parallel, and thus a total of six display devices 10A and 10B are provided. Although the six display devices 10A and 10B have the same size and specifications, for convenience of illustration, two display devices 10A arranged vertically at the center portion are referred to as first display devices 10A, and four display devices 10B, two of which are arranged at each side of the first display devices 10A, are referred to as second display devices 10B.

The first display devices 10A arranged at the center portion are connected to each other. The first display device 10A located at the lower part is separated from the ground or the upper surface of a desk by a stand 20 fixed to the rear surfaces of the central regions of the first display devices 10A.

Each of the second display devices 10B arranged at both sides of the first display devices 10A is provided with one side, which is installed at one of the sides of one of the first display devices 10A located at the center portion. In this exemplary embodiment, the first display devices 10A and the second display devices 10B are connected to each other by hinge devices 30 such that they are rotated relative to each other.

Figure 3:
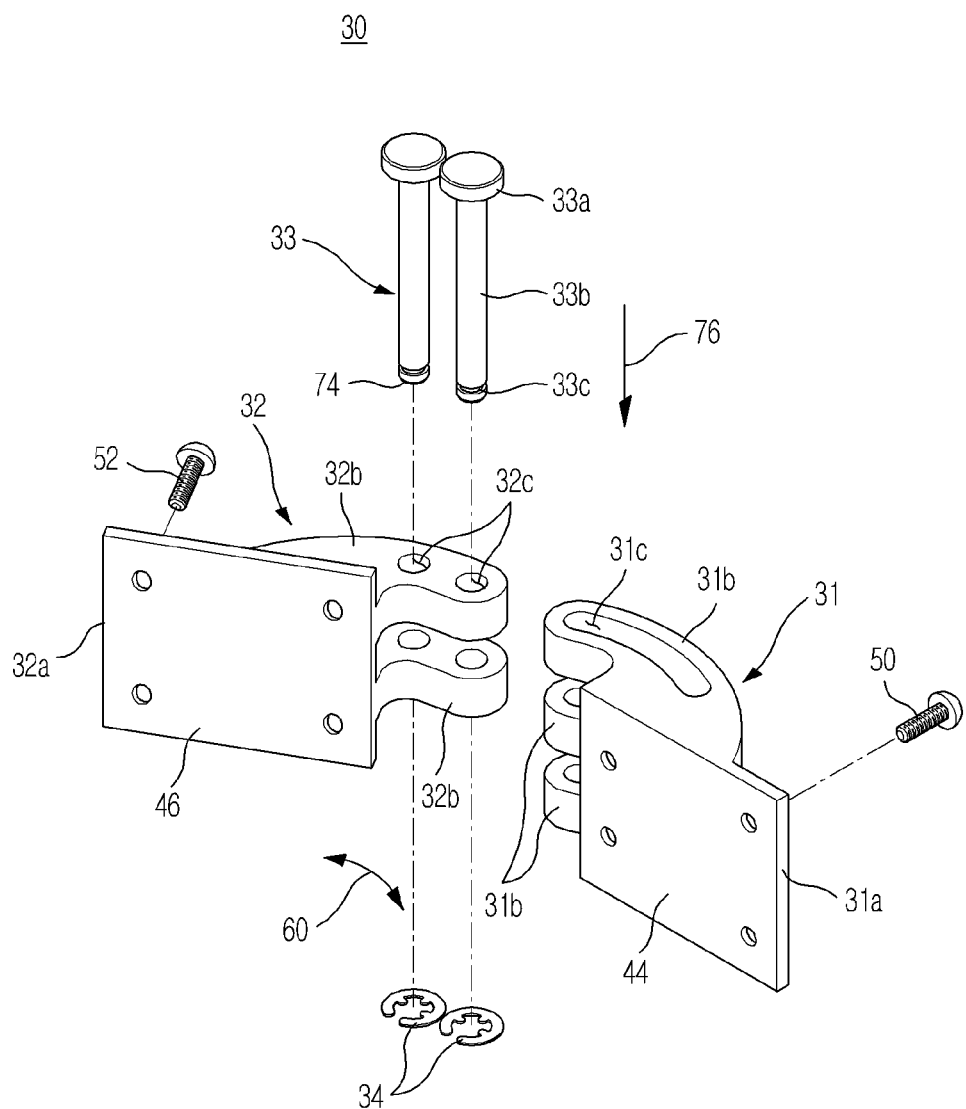
FIG. 3 is an exploded perspective view of a hinge device applied to the multi display apparatus according to an exemplary embodiment.

As shown in FIG. 3, the hinge device 30 includes a first hinge member 31 to be fixed to the first display device 10A, and a second hinge member 32 to be fixed to the second display device 10B and connected to the first hinge member 31 such that the second hinge member 32 may be rotated in the circumferential direction 60. By using the hinge device 30, the first display device 10A and the second display device 10B are installed to be rotated relative to each other. The hinge device 30 may prevent interference between the first display device 10A and the second display device 10B while the first display device 10A and the second display device 10B are rotated relative to each other. The hinge device 30 may be installed on the rear surfaces of the first display device 10A and the second display device 10B, respectively.

The first hinge member 31 includes a first fixing part 31a, the front surface 44 of which is connected to the rear surface 36 of the first display device 10A by coupling members 50, such as screws, and first hinge parts 31b extended from the rear surface of the first fixing part 31a such that the second hinge member 32 is connected to the first fixing part 31b and thus is pivotable in the circumferential direction 60. The second hinge member 32 includes a second fixing part 32a, the front surface 46 of which is connected to the rear surface of the second display device 10B by coupling members 52, such as screws, and second hinge parts 32b extended from the rear surface of the second fixing part 32a and connected to the first hinge parts 31b such that the second hinge parts 32b are movable in the circumferential direction 60.

Figure 6:
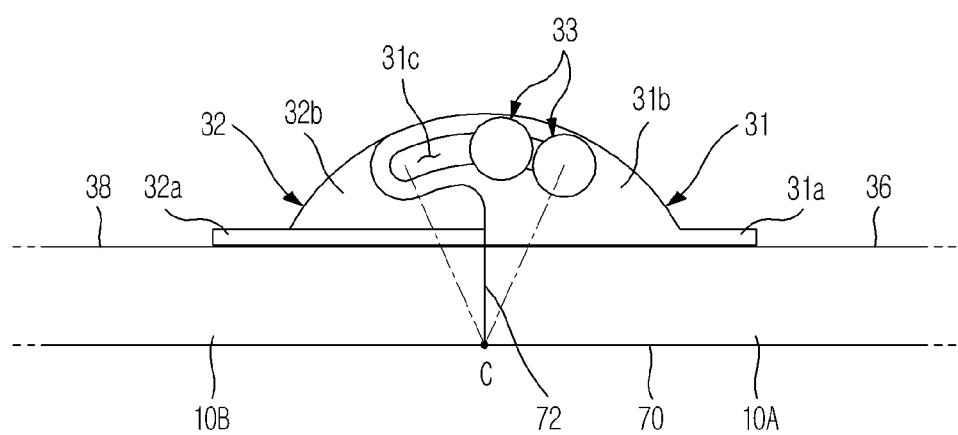
FIG. 6 is a plan view of the hinge device applied to the multi display apparatus according to an exemplary embodiment.

The hinge device 30 further includes guide pins 33 passing through the first hinge parts 31b and the second hinge parts 32b to connect the second hinge parts 32b to the first hinge parts 31b such that the second hinge parts 32b are pivotable in the circumferential direction 60. Guide slots 31c extended in the circumferential direction are provided on the first hinge parts 31b to cause the guide pins 33 to be movable in the circumferential direction 60. Through holes 32c formed in a shape corresponding to the shape of the guide pins 33 to pass the guide pins 33 are provided on the second hinge parts 32b. Here, a central point C of arcs of the guide slots 31c extended in the circumferential direction is set to be located at the front side 70 of the interface between the opposite side surfaces of the first display device 10A and the second display device 10B, as shown in FIG. 6.

In this exemplary embodiment, each of the guide pins 33 includes a head part 33a supported by regions of the first hinge parts 31b adjacent to the guide slots 31c, and a body part 33b extended from the head part 33a and passing through the guide slots 31c and the through holes 32c. A separation prevention ring 34 to maintain a position of the guide pin 33 passed through the first hinge parts 31b and the second hinge parts 32b is provided at the leading portion 74 of the body part 33b passed through the guide slots 31c and the through holes 32c. In this exemplary embodiment, the separation prevention ring 34 may be an E-ring, and a separation prevention groove 33c, in which the separation prevention ring 34 is installed, is formed in the circumferential direction on the outer surface of the leading portion 74 of each of the guide pins 33.

Further, in this exemplary embodiment, to allow the second hinge member 32 to stably move in the circumferential direction, the plural first hinge parts 31b of the first hinge member 31 are separated from each other in the axial direction 76 of the guide pins 33, the plural second hinge parts 32b of the second hinge member 32 are separated from each other in the axial direction 76 of the guide pins 33, and the first hinge parts 31b and the second hinge parts 32b are alternately arranged. A pair of the through holes 32c separated from each other in the circumferential direction 60 is provided on each of the second hinge parts 32b to fit a pair of the guide pins 33. The two guide pins 33 respectively pass through the guide slots 31c and the corresponding through holes 32c.

Figure 4:
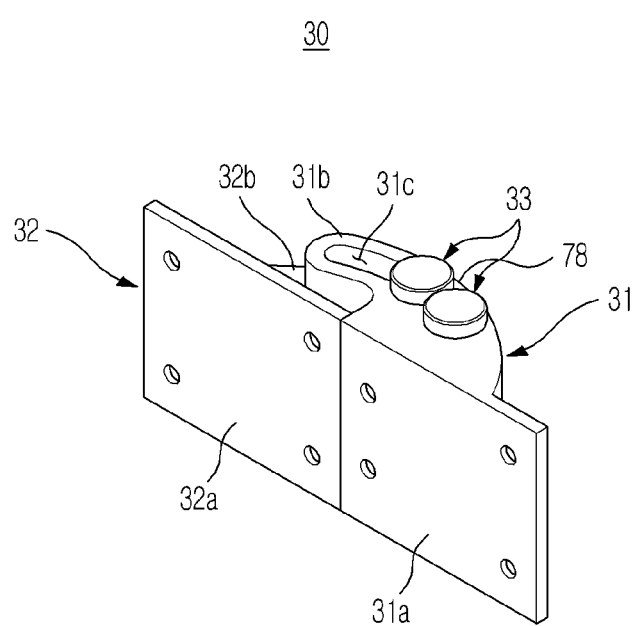
FIGS. 4 and 5 are perspective views illustrating the operation of the hinge device applied to the multi display apparatus according to an exemplary embodiment.

When one first display device 10A and one second display device 10B are arranged in a straight line, as shown in FIG. 1, the surface of the first fixing part 31a of the first hinge member 31 and the surface of the second fixing part 32a of the second hinge member 32 are located on the same plane and a pair of the guide pins 33 is located in first end portions 78 of the guide slots 31c, as shown in FIG. 4.

Figure 5:
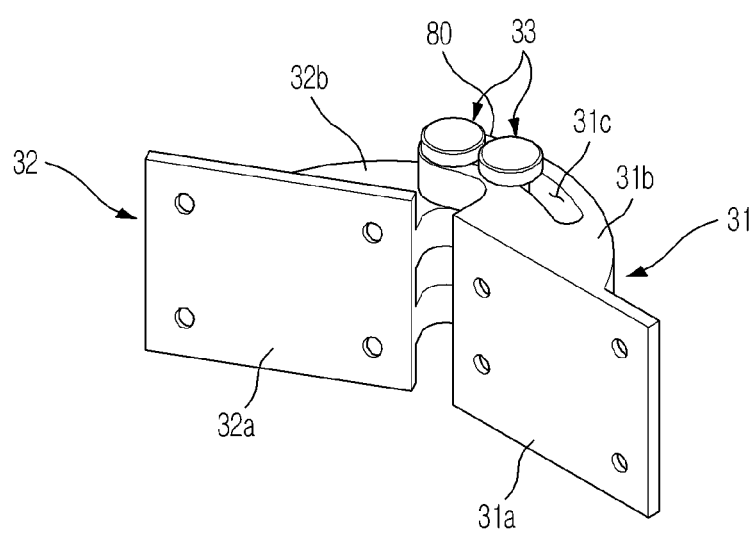

When the second display device 10B is rotated in a circumferential direction 60 by applying force to the second display device 10B, as shown in FIG. 2, the second hinge member 32 is guided by the guide pins 33 and the guide slots 31c and thus moves in the circumferential direction 60, and the guide pins 33 move to a second portion 80 of the guide slots 31c, as shown in FIG. 5. Since the central point C of the arcs of the guide slots 31c is set to be located at the front side 70 of the interface 72 between the opposite side surfaces of the first display device 10A and the second display device 10B, as described above, a center of rotation of the second hinge member 32 moving in the circumferential direction 60 is located at the front side 70 of the interface 72 between the opposite side surfaces of the first display device 10A and the second display device 10B, and thereby, the second display device 10B is rotated about the front side 70 of the interface 72 between the opposite side surfaces of the first display device 10A and the second display device 10B. Therefore, the second display device 10B is rotated under the condition that a minimum distance between a display screen of the first display device 10A and a display screen of the second display device 10B is maintained.

Although this exemplary embodiment illustrates that the plurality of first hinge parts 31b is formed on the first hinge member 31 and the plurality of second hinge parts 32b is formed on the second hinge member 32, one or more first hinge parts 31b and/or one or more second hinge parts 32b may be provided.

Further, although this exemplary embodiment illustrates that the hinge device 30 is provided in the multi display apparatus 100, the hinge device 30 may be provided in various devices. That is, the hinge device 30 may be provided in various devices including a first member and a second member corresponding to the first display device 10A and the second display device 10B such that the first hinge member 31 is installed on the first member and the second hinge member 32 is installed on the second member to rotate the first member and the second member relative to each other.

Hereinafter, a hinge device applied to a multi display apparatus in accordance with another exemplary embodiment is described in detail with reference to FIGS. 7 and 8.

Figure 7:
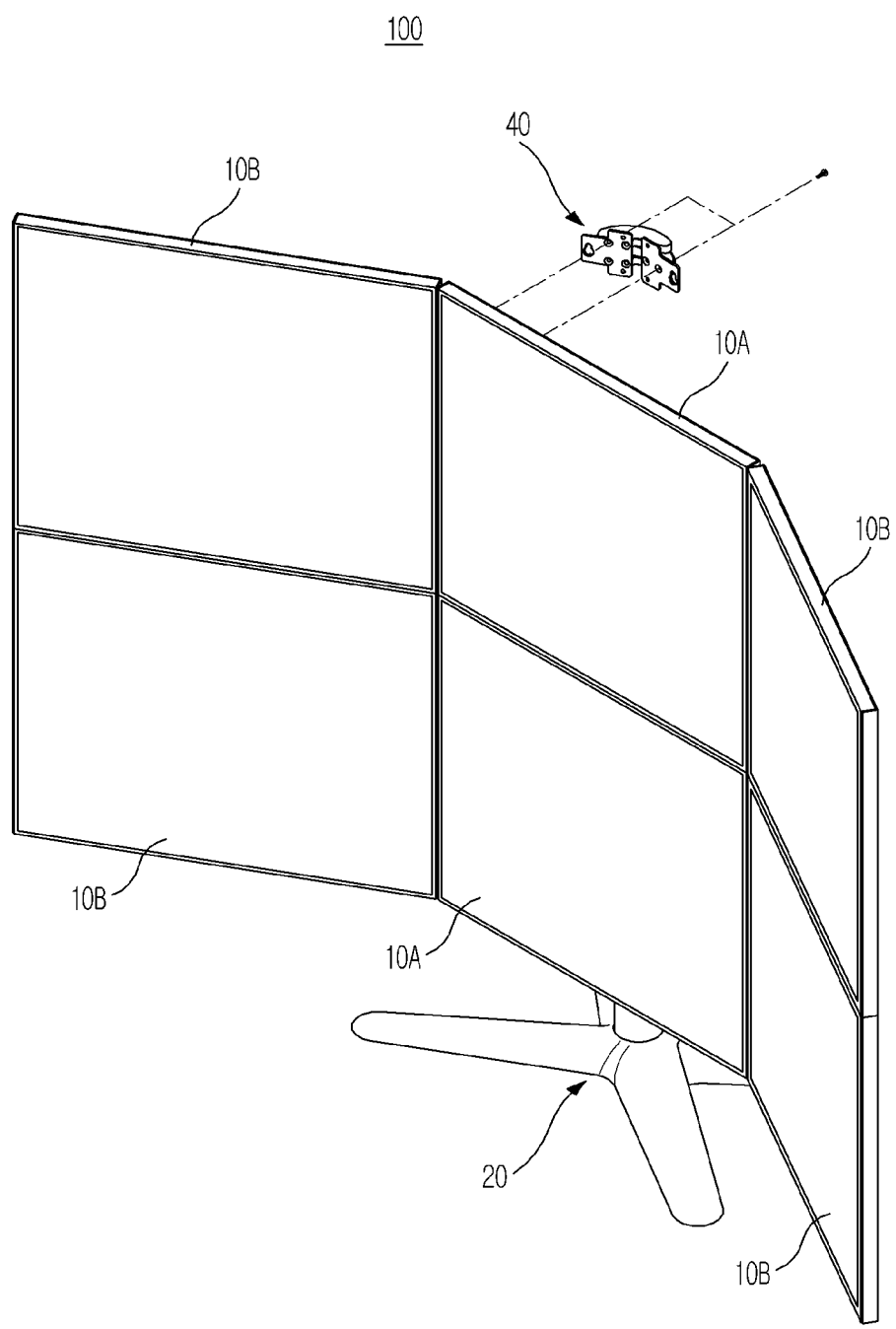
FIG. 7 is a perspective view of a hinge device applied to a multi display apparatus according to another exemplary embodiment.
Figure 8:
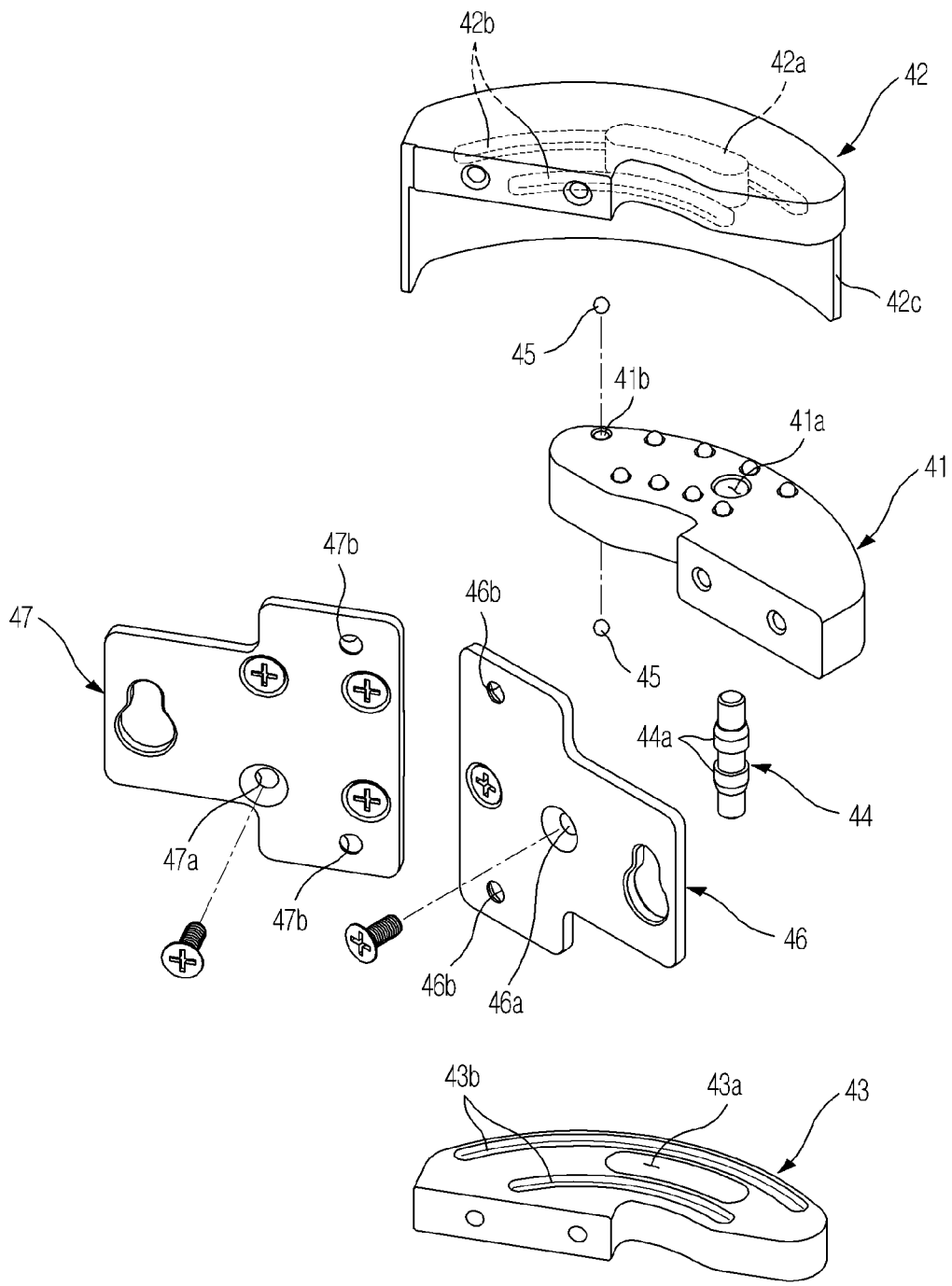
FIG. 8 is an exploded perspective view of the hinge device applied to the multi display apparatus according to another exemplary embodiment.

As shown in FIGS. 7 and 8, a hinge device 40 in accordance with this exemplary embodiment includes a first hinge member 41 fixed to the first display device 10A and second hinge members 42 and 43 fixed to the second display device 10B and connected to the first hinge member 41 such that the second hinge members 42 and 43 may move in the circumferential direction.

The second hinge members 42 and 43 include an upper second hinge member 42 arranged above the upper surface of the first hinge member 41 and a lower second hinge member 43 arranged below the lower surface of the first hinge member 41. Therefore, the first hinge member 41 is arranged between the upper second hinge member 42 and the lower second hinge member 43.

A cover part 42c is extended downwards from the upper second hinge member 42 so as to cover rear portions of the first hinge member 41 and the lower second hinge member 43. The cover part 42c covers the rear portions of the first hinge member 41 and the lower second hinge member 43, thereby preventing lowering of external appearance quality of the multi display apparatus due to the hinge device 40.

The hinge device 40 further includes a guide pin 44 enabling the first hinge member 41 to move in the circumferential direction between the upper second hinge member 42 and the lower second hinge member 43. A through hole 41a, through which the guide pin 44 vertically passes, is formed through the first hinge member 41, and guide slots 42a and 43a, on which the upper and lower ends of the guide pin 44 are movably installed, are respectively provided in the circumferential direction on the lower surface of the upper second hinge member 42 and the upper surface of the lower second hinge member 43. Protrusions 44a enabling the guide pin 44 to stably move along the guide slots 42a and 43a under the condition that the guide pin 44 is installed in the through hole 41a are provided on the guide pin 44.

The hinge device 40 further includes fixing pieces 46 and 47 enabling the first hinge member 41 and the second hinge members 42 and 43 to be installed on the first display device 10A and the second display device 10B. The fixing pieces 46 and 47 include a first fixing piece 46 fixed to the first hinge member 41 and fixed to the rear surface of the first display device 10A under the condition that the first fixing piece 46 is fixed to the first hinge member 41 so as to enable the first hinge member 41 to be fixed to the rear surface of the first display device 10A, and a second fixing piece 47 fixed to the second hinge members 42 and 43 and fixed to the rear surface of the second display device 10B under the condition that the second fixing piece 47 is fixed to the second hinge members 42 and 43 so as to enable the second hinge members 42 and 43 to be fixed to the rear surface of the second display device 10B.

In this exemplary embodiment, since the second hinge members 42 and 43 include the upper second hinge member 42 and the lower second hinge member 43, the second fixing piece 47 is fixed to the upper second hinge member 42 and the lower second hinge member 43 and thus serves to maintain a state in which the upper second hinge member 42 and the lower second hinge member 43 are separated from each other by a designated distance.

A plurality of coupling holes 46a and 47a enabling the first fixing piece 46 and the second fixing piece 47 to be respectively fixed to the first hinge member 41 and the second hinge members 42 and 43 through coupling members, such as screws, and a plurality of coupling holes 46b and 47b enabling the first fixing piece 46 and the second fixing piece 47 to be respectively fixed to the first display device 10A and the second display device 10B through coupling members are provided on the first fixing piece 46 and the second fixing piece 47, respectively.

Rolling members 45 are arranged between the first hinge member 41 and the second hinge members 42 and 43 so as to enable the first hinge member 41 and the second hinge members 42 and 43 to more easily relatively in the circumferential direction. In this embodiment, plural ball-shaped rolling members 45 are separated from each other in lines in the circumferential direction, and are arranged in two lines in the radial direction.

In order to install such rolling members 45, a plurality of semicircular receipt holes 41*b* depressed to receive one portion of each of the rolling members 45 is provided on the upper surface and the lower surface of the first hinge member 41. Such receipt holes 41*b* are arranged in two lines so that the rolling members 45 may be arranged in two lines, as described above.

Guide grooves 42*b* and 43*b* to receive the other portion of each of the rolling members 45 are provided in the circumferential direction on the lower surface of the upper second hinge member 42 and the upper surface of the lower second hinge member 43 corresponding to the upper surface and the lower surface of the first hinge member 41, thereby guiding movement of the rolling members 45 in the circumferential direction.

Therefore, the first hinge member 41 and the second hinge members 42 and 43 relatively move in the circumferential direction under the condition that the first hinge member 41 and the second hinge members 42 and 43 are supported by each other through the rolling members 45, thereby facilitating rotation of the first display device 10A and the second display device 10B even by small force.

As is apparent from the above description, a first display device and a second display device are installed such that they are rotated relative to each other by using a hinge device in accordance with exemplary embodiments. The hinge device is installed on the rear surfaces of the first display device and the second display device, and prevents interference between the first display device and the second display device generated during the relative rotation of the first and second display devices.

Further, since a central point of arcs of guide slots is located at the front end of the interface between of the opposite side surfaces of the first display device and the second display device, the second display device is rotated under the condition that a minimum distance between a display screen of the first display device and a display screen of the second display device is maintained.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A multi display apparatus comprising:
   a first display device and a second display device arranged adjacent to each other; and
   a hinge device provided to rotate the first display device and the second display device relative to each other,
   wherein the hinge device comprises a first hinge member fixed to the first display device, and at least one second hinge member fixed to the second display device and connected to the first hinge member so that the at least one second hinge member is movable in a circumferential direction with respect to an interface between adjacent side surfaces of the first display device and the second display device,
   wherein the at least one second hinge member comprises an upper second hinge member which is arranged above an upper surface of the first hinge member, and a lower second hinge member which is arranged below a lower surface of the first hinge member and configured to be separable from the upper second hinge member, and
   wherein the multi display apparatus further comprises:
   rolling members which are separated from each other in lines in the circumferential direction, and arranged between the upper surface of the first hinge member and the upper second hinge member and between the lower surface of the first hinge member and the lower second hinge member;
   a plurality of receipt holes which are disposed on the upper surface and the lower surface of the first hinge member and separated from each other in the circumferential direction to receive a first portion of each of the rolling members; and
   guide grooves respectively provided in the circumferential direction on a lower surface of the upper second hinge member and an upper surface of the lower second hinge member to movably install a second portion of each of the rolling members.

2. The multi display apparatus according to claim 1, wherein the upper second hinge member comprises a cover part which covers rear portions of the first hinge member and the lower second hinge member.

3. The multi display apparatus according to claim 1, wherein the hinge device further comprises:
   a guide pin which vertically passes through the first hinge member;
   a through hole formed through the first hinge member to install the guide pin; and
   guide slots which are disposed in the circumferential direction on the lower surface of the upper second hinge member and the upper surface of the lower second hinge member such that both ends of the guide pin move in the circumferential direction along the guide slots, respectively.

4. The multi display apparatus according to claim 1, wherein the hinge device further comprises:
   a first fixing piece fixed to the first hinge member and a rear surface of the first display device; and
   a second fixing piece fixed to the upper second hinge member, the lower second hinge member, and a rear surface of the second display device.

5. A multi display apparatus comprising:
   a first display device and a second display device arranged adjacent to each other; and
   a hinge device provided to rotate the first display device and the second display device relative to each other,
   wherein the hinge device comprises a first hinge member fixed to the first display device, and at least one second hinge member fixed to the second display device and connected to the first hinge member so that the at least one second hinge member is movable in a circumferential direction with respect to an interface between adjacent side surfaces of the first display device and the second display device,
   wherein a central point of an arc of the at least one second hinge member moving in the circumferential direction is located at a front side of the interface between the adjacent side surfaces of the first display device and the second display device, wherein the at least one second hinge member comprises an upper second hinge member arranged above an upper surface of the first hinge member and a lower second hinge member arranged below a lower surface of the first hinge member, the lower second hinge member is configured to be separable from the upper second hinge member, and wherein the multi display apparatus further comprises:

rolling members which are separated from each other in lines in the circumferential direction, and arranged between the upper surface of the first hinge member and the upper second hinge member and between the lower surface of the first hinge member and the lower second hinge member;

a plurality of receipt holes which are disposed on the upper surface and the lower surface of the first hinge member and separated from each other in the circumferential direction to receive a first portion of each of the rolling members; and guide grooves respectively provided in the circumferential direction on a lower surface of the upper second hinge member and an upper surface of the lower second hinge member to movably install a second portion of each of the plurality of rolling members.

6. The multi display apparatus according to claim 5, wherein the plurality of rolling members formed in a ball shape.

7. A hinge device comprising:

a first hinge member fixed to a first member;

at least one second hinge member which is fixed to a second member adjacent to the first member and connected to the first hinge member so that the at least one second hinge member is movable in a circumferential direction with respect to an interface between adjacent side surfaces of the first member and the second member, wherein the at least one second hinge member comprises an upper second hinge member arranged above an upper surface of the first hinge member and a lower second hinge member arranged below a lower surface of the first hinge member, the lower second hinge member is configured to be separable from the upper second hinge member, wherein the hinge device further comprises:

rolling members which are separated from each other in lines in the circumferential direction, and arranged between the upper surface of the first hinge member and the upper second hinge member and between the lower surface of the first hinge member and the lower second hinge member;

a plurality of receipt holes which are disposed on the upper surface and the lower surface of the first hinge member and separated from each other in the circumferential direction to receive a first portion of each of the rolling members; and guide grooves which are respectively disposed in the circumferential direction on a lower surface of the upper second hinge member and an upper surface of the lower second hinge member to movably install a second portion of each of the rolling members.

8. The hinge device according to claim 7, wherein the upper second hinge member comprises a cover part which covers rear portions of the first hinge member and the lower second hinge member.

9. The hinge device according to claim 7, further comprising:

a guide pin which vertically passes through the first hinge member;

a through hole formed through the first hinge member to install the guide pin; and guide slots respectively disposed in the circumferential direction on the lower surface of the upper second hinge member and the upper surface of the lower second hinge member such that both ends of the guide pin move in the circumferential direction along the guide slots, respectively.

10. The hinge device according to claim 7, further comprising:

a first fixing piece fixed to the first hinge member and the rear surface of the first member; and a second fixing piece fixed to the upper second hinge member, the lower second hinge member, and the rear surface of the second member.

* * * * *